UNITED STATES PATENT OFFICE.

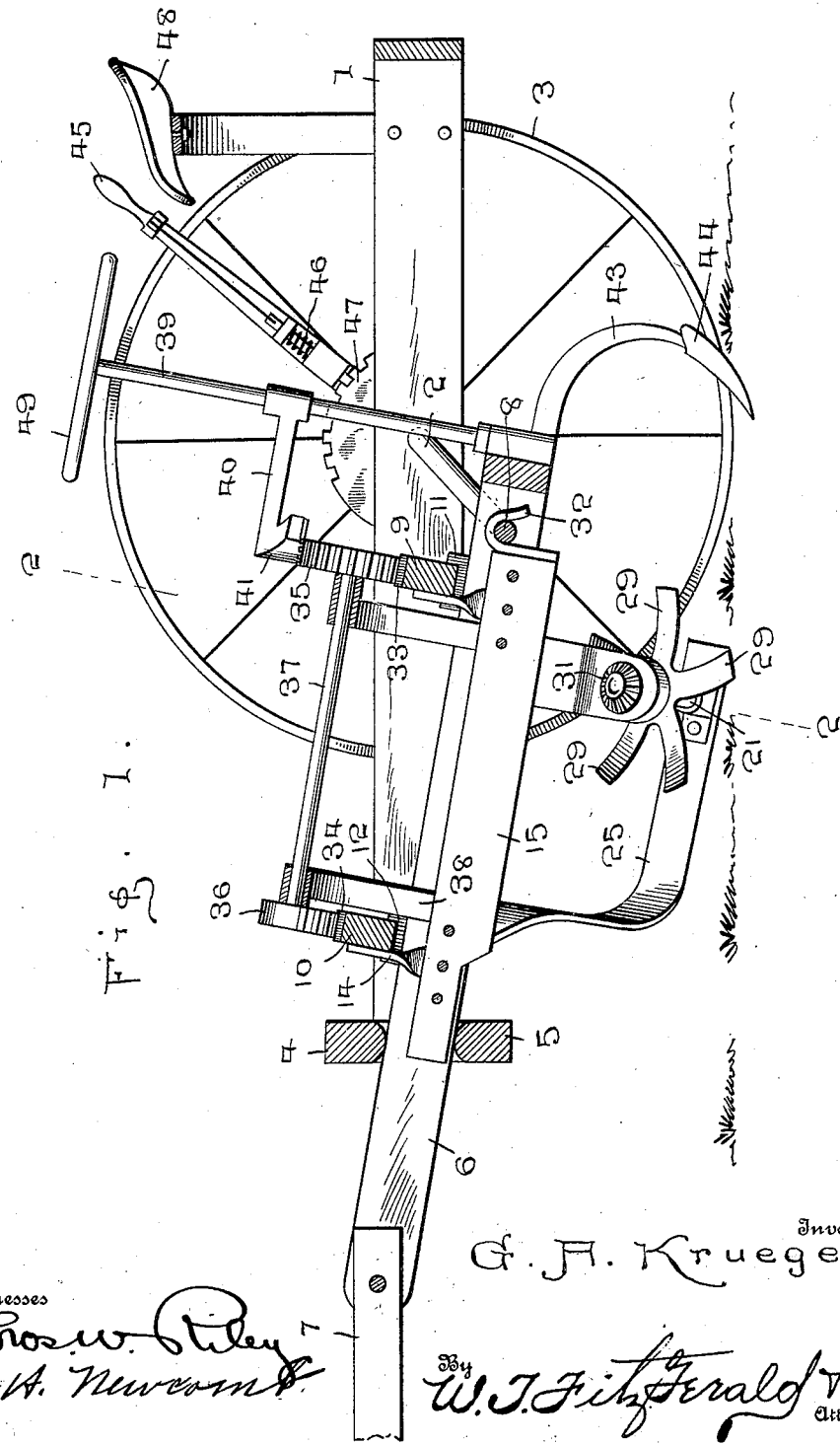

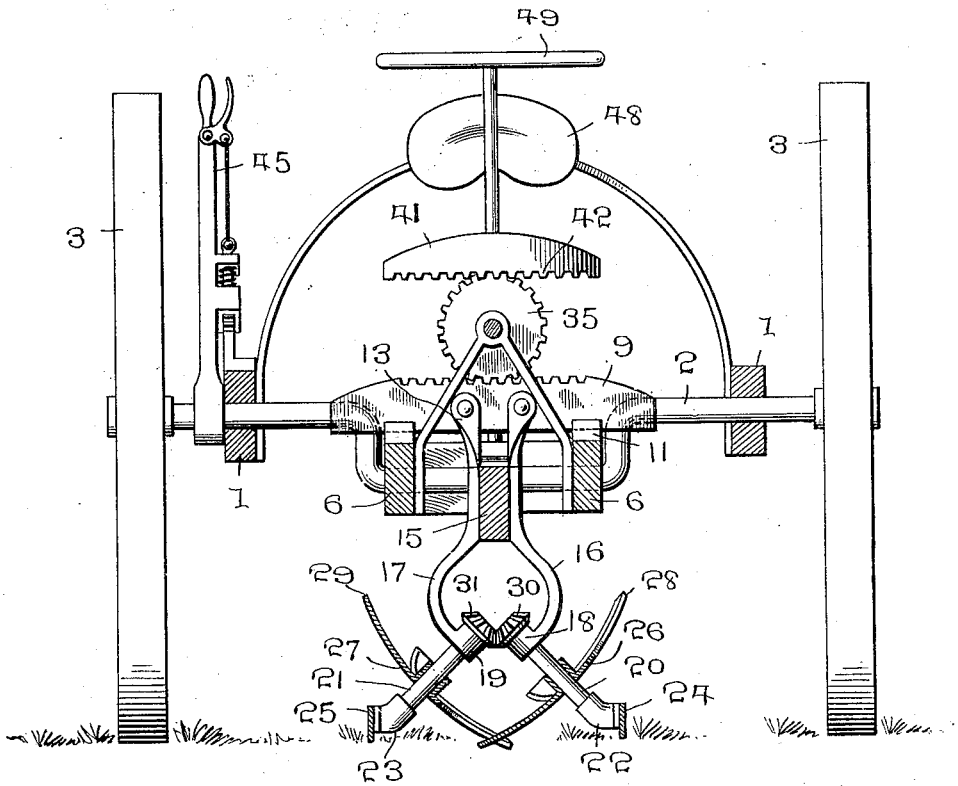

GUSTAV ADOLF KRUEGER, OF MANOR, TEXAS.

COMBINED COTTON CHOPPER AND CULTIVATOR.

No. 917,080.　　　Specification of Letters Patent.　　　Patented April 6, 1909.

Application filed October 13, 1908. Serial No. 457,506.

*To all whom it may concern:*

Be it known that I, GUSTAV A. KRUEGER, a citizen of the United States, residing at Manor, in the county of Travis and State of Texas, have invented certain new and useful Improvements in a Combined Cotton Chopper and Cultivator; and I do hereby declare the following to be a full, clear, and exact description of the invention, such as will enable others skilled in the art to which it appertains to make and use the same.

My invention relates to new and useful improvements in combined cotton choppers and cultivators and my object is to provide chopping devices which will be operated by coming in contact with the soil and operate in unison with each other.

A further object is to provide means for shifting laterally the chopping devices and cultivators whereby the row of plants may be readily followed and a further object is to provide means for raising the choppers and cultivators.

Other objects and advantages will be hereinafter referred to and more particularly pointed out in the claims.

In the accompanying drawings which are made a part of this application, Figure 1 is a central longitudinal sectional view through the combined chopper and cultivator, and, Fig. 2 is a transverse vertical sectional view as seen on line 2—2, Fig. 1.

Referring to the drawings in which similar reference numerals designate corresponding parts throughout the several views, 1 indicates the frame of my improved cultivator, which is preferably rectangular, said frame having an axle 2 extending laterally therethrough, to the outer ends of which axle are secured supporting wheels 3.

The forward end of the frame 1 is formed of a pair of bars 4 and 5, between which is introduced an auxiliary frame 6, the opposed edges of said bars being preferably rounded, whereby the auxiliary frame may be rocked.

To the forward end of the auxiliary frame 6 is secured a tongue 7, while the rear end of the auxiliary frame is pivotally secured to a crank portion 8 of the axle 2, so that by rotating the axle, the rear portion of the auxiliary frame may be raised or lowered as desired, the bar 5 forming a fulcrum for the auxiliary frame.

Extending laterally across the auxiliary frame are beams 9 and 10, said beams resting in guide blocks 11 and 12, respectively, said blocks having notches in which the beams rest and by thus mounting the beams, they may be moved longitudinally when desired.

Depending from the beams 9 and 10 are straps 13 and 14, said straps being preferably arranged in pairs and have fixed between their depending ends, a beam 15, said beam having secured thereto and depending therefrom, a pair of hangers 16 and 17, the lower portions of said hangers being preferably curved and their terminals provided with bearings 18 and 19, respectively, through which extend the upper ends of shafts 20 and 21, respectively, the lower ends of said shafts entering sockets 22 and 23, carried by runners 24 and 25, the forward ends of said runners being bent inwardly and upwardly and attached to the beam 15 adjacent its forward end and as the sockets 22 and 23 are at a distance below and at each side of the bearings 18 and 19, respectively, the shafts 20 and 21 will be extended at an angle.

Fixed to the shafts 20 and 21 at a suitable point between the bearings and sockets are chopping disks 26 and 27, respectively, said disks being provided with curved radiating arms 28 and 29, the disk on one of the shafts being so positioned that its arms will alternately enter the space between the arms on the opposite disk and in view of the angle of the shafts 20 and 21, the arms of each disk will be brought into engagement with the earth's surface one at a time and as the frame is moved forwardly, the engagement of the arms with the earth, will cause said disks to rotate.

The disks are caused to rotate in unison and the arms of each disk maintained in proper position to enter between the arms on the opposite disk by securing to the upper ends of the shafts 20 and 21, intermeshing pinions 30 and 31, respectively, and when the disks are properly secured to their respective shafts, the arms thereon will be held in position to intermesh with each other at all times.

The width of the arms are much less than the width of the space between the arms, so that as the machine is moved forwardly, a portion only of the growing plants will be removed by the chopping disks and as the rotation of the disks is controlled by contacting with the earth's surface, the plants left standing in the row, will be a uniform distance apart.

The strain on the straps 13 and the beams 9 and 10, coincident to the disks engaging the earth's surface, is practically eliminated by securing to the rear end of the beam 15, a hook 32, which hook is adapted to engage the cranked portion of the axle 2.

Should the draft animals move sidewise and thus move the chopping disks to one side of the row of growing plants, I have provided means for shifting the beam laterally, which consists in providing the upper edges of the beams 9 and 10 with racks 33 and 34, respectively, with which are adapted to mesh gears 35 and 36, respectively, carried by a shaft 37, said shaft being rotatably mounted in brackets 38 carried by the frame 6.

Extending upwardly from the rear end of the auxiliary frame 6 is a guide rod 39, secured to which is an extension 40 having at its outer end a cross head 41, the lower face of which is provided with teeth 42, which teeth are adapted to mesh with the gear 35, so that when it is desired to shift the beam 15 and chopping disks carried thereby, the guide rod 39 is to be rotated, the swinging movement of the cross head rotating the gears 35 and 36 and thereby moving the beams 9 and 10 longitudinally and the beam 15 carried thereby, laterally, thus maintaining the chopping disks in alinement with the row of growing plants independently of the position of the frame of the cultivator.

Extending rearwardly from the side bars of the auxiliary frame 6 are shanks 43, to the lower ends of which are secured the usual or any preferred form of cultivating shovel 44, and by which means the soil between the rows of growing plants is cultivated.

The axle 2 is rotated to raise and lower the auxiliary frame 6 through the medium of a lever 45, which lever is fixed at its lower end to the axle and at a point adjacent one of the side bars of the frame 1, said lever having the usual or any preferred form of latch 46, which is adapted to coöperate with a rack 47 on the frame 1, whereby the rear end of the auxiliary frame may be raised a sufficient distance to entirely disengage the chopping disks and cultivating shovels from the earth's surface or may be lowered to various depths as occasion may require for shallow or deep cultivation.

In order to better control the various parts of the machine, a seat 48 is mounted on the rear portion of the frame 1 and in such position as to bring the operator in close touch with the lever 45 and the hand wheel 49 at the upper end of the guide rod 39, so that the lever and guide rod may be quickly operated as desired.

What I claim is:

1. In a combined cotton chopper and cultivator, the combination with a frame and an axle extending laterally through said frame and having a cranked portion; of an auxiliary frame having one of its ends engaging the cranked portion of the axle and the opposite end engaging the forward portion of the main frame, a pair of beams slidably mounted on the auxiliary frame, an additional beam suspended from the first-mentioned beams, chopping disks carried by the last-mentioned beam, means to cause said disks to rotate in unison and additional means coöperating with the sliding beams to move the suspended beam and chopping disk carried thereby, laterally.

2. In a combined cotton chopper and cultivator, the combination with a frame having spaced bars at its forward end and an axle extending laterally through the frame, said axle having a cranked portion; of an auxiliary frame having its forward end extended between said bars and its rear end mounted on the cranked portion of the axle, means to rotate said axle, whereby the rear end of the auxiliary frame may be raised or lowered, a pair of slidably mounted beams on the auxiliary frame, a beam extending longitudinally of the frame and carried by the sliding beams, a pair of hangers on the last-mentioned beam, a pair of runners extending downwardly and rearwardly from the forward end of the last-mentioned beam, shafts extending from the hangers to the runners, chopping disks fixed to said shafts and having arms at their peripheral edges, means at the upper ends of the shafts to cause the disks to rotate in unison and additional means to engage the sliding beams to move the same longitudinally and shift the suspended beam and parts carried thereby laterally.

3. In a combined cotton chopper and cultivator, the combination with a main frame; of an auxiliary frame a pair of bars slidably mounted on the auxiliary frame, chopping disks suspended from said bars and means engaging the bars to move the same longitudinally, whereby the path of the chopping disks may be shifted.

4. In a combined cotton chopper and cultivator, the combination with a frame and a supporting axle therefor; of an auxiliary frame supported by the main frame and axle, a beam extending longitudinally of the auxiliary frame, means to shift said beam laterally, hangers depending from said beam, said hangers terminating in bearings, a pair of runners carried by said beam, sockets on said runners, shafts extending from said sockets and through the bearings on the hangers, intermeshing pinions at the upper ends of the shafts to cause said shafts to rotate in unison, a chopping disk on each of said shafts, said disks having spaced arms, the arms of one disk entering the spaces between the arms of the opposite disk and means to raise and lower said disks.

5. In a combined cotton chopper and cultivator, the combination with a frame, a supporting axle and an auxiliary frame carried by the main frame and axle; of a pair of bars longitudinally movable on the auxiliary frame, chopping disks suspended from said beams, racks formed on the upper edge of said beams, a shaft supported by the auxiliary frame, gears on said shaft engaging the racks on the beams and means engaging one of said gears to rotate the shaft, whereby the path of the chopping disks will be regulated.

In testimony whereof I have signed my name to this specification in the presence of two subscribing witnesses.

GUSTAV ADOLF KRUEGER.

Witnesses:
ROBERT WENTHREL,
G. W. PRINZ.